United States Patent
Froehlich et al.

(10) Patent No.: US 11,992,943 B2
(45) Date of Patent: May 28, 2024

(54) METHOD FOR OPTIMIZING A POLICY FOR A ROBOT

(71) Applicant: Robert Bosch GmbH, Stuttgart (DE)

(72) Inventors: Lukas Froehlich, Freiburg (DE); Edgar Klenske, Renningen (DE); Leonel Rozo, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 454 days.

(21) Appl. No.: 17/450,794

(22) Filed: Oct. 13, 2021

(65) Prior Publication Data

US 2022/0126441 A1 Apr. 28, 2022

(30) Foreign Application Priority Data

Oct. 28, 2020 (DE) .......................... 102020213527.4

(51) Int. Cl.
*G05B 13/00* (2006.01)
*B25J 9/16* (2006.01)
*G05B 13/04* (2006.01)

(52) U.S. Cl.
CPC .......... *B25J 9/1605* (2013.01); *G05B 13/042* (2013.01)

(58) Field of Classification Search
CPC ........ B25J 9/1605; B25J 9/163; B25J 9/1664; B25J 9/1602; B25J 9/1694; G05B 13/042; G06F 17/11; G06F 18/214
See application file for complete search history.

(56) References Cited

U.S. PATENT DOCUMENTS

2014/0277744 A1* 9/2014 Coenen .................. G06N 3/049
901/3

OTHER PUBLICATIONS

Shahriari et al., "Taking the Human out of the Loop: A Review of Bayesian Optimization," Proceedings of the IEEE 104.1, 2015, pp. 1-24. <https://www.cs.ox.ac.uk/people/nando.defreitas/publications/BayesOptLoop.pdf> Downloaded Oct. 12, 2021.
Calinon, "A Tutorial on Task-Parameterized Movement Learning and Retrieval," Intelligent Service Robotics, vol. 9, No. 1, 2016, pp. 1-28. <https://calinon.ch/papers/Calinon-JIST2015.pdf> Downloaded Oct. 12, 2021.

(Continued)

*Primary Examiner* — Adam R Mott
*Assistant Examiner* — Shaheda Shabnam Hoque
(74) *Attorney, Agent, or Firm* — NORTON ROSE FULBRIGHT US LLP; Gerard A. Messina

(57) ABSTRACT

A method for optimizing a predefined policy for a robot, the policy being a Gaussian mixture model. The method begins with an initialization of a Gaussian process, the Gaussian process including at least one kernel k which, as an input parameter, obtains a distance that is ascertained between probability distributions, which are characterized in each case by the Gaussian mixture model and the Gaussian process, according to the probability product kernel. This is followed by an optimization of the Gaussian process in such a way that it predicts the costs as a function of the parameters of the Gaussian mixture model. This is followed by an ascertainment of optimal parameters of the Gaussian mixture model as a function of the Gaussian process, the parameters being selected, as a function of the Gaussian process, in such a way that the Gaussian process outputs the optimal cost function.

12 Claims, 3 Drawing Sheets

(56) References Cited

OTHER PUBLICATIONS

Jebara et al., "Probability Product Kernels," Journal of Machine Learning Research, vol. 5, 2004, pp. 819-844. <https://www.jmlr.org/papers/volume5/jebara04a/jebara04a.pdf> Downloaded Oct. 12, 2021.

Frohlich et al., "Bayesian Optimization for Policy Search in High-Dimensional Systems via Automatic Domain Selection," Cornell University, 2020, pp. 1-8. <https://arxiv.org/pdf/2001.07394.pdf> Downloaded Oct. 12, 2021.

* cited by examiner

METHOD FOR OPTIMIZING A POLICY FOR A ROBOT

CROSS REFERENCE

The present application claims the benefit under 35 U.S.C. § 119 of German Patent Application No. DE 102020213527.4 filed on Oct. 28, 2020, which is expressly incorporated herein by reference in its entirety.

FIELD

The present invention relates to a method for optimizing a policy for a robot that is implemented with the aid of a Gaussian mixture model, and a device, a computer program, and a machine-readable memory medium.

BACKGROUND INFORMATION

Gaussian processes (GPs) as well as optimization of same with the aid of Bayesian optimization (BO) are described in a paper by Shahriari, Bobak, et al., "Taking the human out of the loop: A review of Bayesian optimization," Proceedings of the IEEE 104.1 (2015): 148-175.

Gaussian mixture models (GMMs for short) for control policies for robots are described in a paper by Calinon, Sylvain, "A tutorial on task-parameterized movement learning and retrieval," Intelligent Service Robotics 9.1 (2016): 1-29.

A probability product kernel (PPK for short) is described in a paper by Jebara, Tony, et al., "Probability product kernels," Journal of Machine Learning Research, July 5 (2004): 819-844.

SUMMARY

Bayesian optimization (BO) may efficiently optimize complex robot problems. However, one disadvantage of Bayesian optimization is that it typically is not well scalable to high-dimensional problems, such as the direct optimization of the parameters of a policy for robots which is implemented with the aid of a Gaussian mixture model. Thus, only a limited, small number of mixture components of the Gaussian mixture model may be optimized. In accordance with an example embodiment of the present invention, the inventors provide for mitigating the so-called "curse of dimensionality" by utilizing a structure of the policy, for which purpose a specific kernel is provided.

Advantages of the kernel according to the present invention may include that, on the one hand, the search space is significantly reduced by utilizing symmetries of the search space, and on the other hand, the interpretability of the policy is also increased.

It is thus possible to efficiently optimize a high-dimensional Gaussian mixture model policy via BO, for example, since the kernel according to the present invention effectively reduces the dimensionality. Since high-dimensional Gaussian mixture model policies may now be optimized, ultimately a more accurate and more reliable policy for robots may also be provided.

In a first aspect, the present invention relates to a computer-implemented method for optimizing a predefined policy for a robot, the policy being a Gaussian mixture model (GMM) that outputs at least one partial trajectory as a function of a starting and a target position/state of the robot. In accordance with an example embodiment of the present invention, the predefined policy is preferably sub-optimal; i.e., it is usable, but not in an optimal manner with regard to a predefined criterion such as costs. Consequently, it may be stated that the policy is already partially configured to output a partial trajectory. A partial trajectory may be understood to mean that it is a section of a complete trajectory, the complete trajectory characterizing a path or a motion of the robot, so that the robot reaches the target position by using the complete trajectory. The partial trajectory may be a section of a path or a (partial) motion, in particular an action, of the robot, multiple partial trajectories combined in succession resulting in the complete trajectory. The partial trajectory preferably corresponds to an action of the robot.

In accordance with an example embodiment of the present invention, the method begins with an initialization of a Gaussian process that is suitable for estimating, in particular ascertaining, as a function of a parameterization of the GMM, costs that the robot must incur for reaching the target position. The parameterization of the GMM is understood to mean the parameters of the GMM. The parameters of the GMM are expected values and variances of the individual mixture components of the GMM. The costs may characterize expenditures of the robot which the robot must incur in order to reach the target position or state. Additionally or alternatively, the costs may characterize penalties that the robot would take when it pursues a poor partial trajectory. The costs are preferably computed using a cost function.

The Gaussian process includes at least one kernel k that describes the similarity between two input parameters. The kernel is also known by the term "covariance function for GPs." In many cases, this degree of similarity is a function of the distance between the two input parameters. In the case of the present invention, the input parameters are described by GMMs. For this purpose, the distance between two GMMs is ascertained according to a metric based on the PPK.

This is followed by a creation of a plurality of trajectories as a function of the policy, preferably in each case one trajectory per policy. Partial trajectories may be determined in succession and then combined into one trajectory. It is conceivable for this procedure to be repeated multiple times in order to determine the plurality of trajectories. However, it is also conceivable for the plurality of trajectories to be created as a function of a slightly changed parameterized GMM, for this purpose the parameters of the GMM being slightly changed, in particular, given individual mixture components being randomly scattered around the parameter values. It is conceivable to change parameters for predefined mixture components in a targeted manner, or to change all mixture components. Costs for the plurality of trajectories are subsequently ascertained. It may be stated that a plurality of different policies, i.e., different parameterizations of the GMM, roll out, and the costs are determined for each rollout.

This is followed by an optimization of the GP in such a way that, for the plurality of trajectories, it essentially predicts the particular associated costs of the particular trajectories as a function of used parameters of the GMM. BO is preferably used for this purpose.

An ascertainment of new parameters for the GMM may subsequently take place by optimizing an acquisition function. A resulting policy that includes the new parameters of the GMM may be subsequently rolled out and its costs determined. Thus, at least one further trajectory is created and its costs are ascertained.

The GP may be subsequently adapted, in particular retrained, using the new data. The steps of ascertaining new parameters and retraining the GP may be repeated multiple times until, for example, the GP reaches a sufficient prediction quality or a maximum number of experiments has been reached.

This is followed by an ascertainment of optimal parameters for the GMM as a function of the GP, so that the GP outputs optimal costs for the optimal parameters, and this is followed by a replacement of the parameters of the policy with the optimal parameters.

It is provided that the distance according to the PPK is computed with the aid of an inner product $\langle p,q \rangle$ between GMM p and data points q of GP p. It is noted that the data points, also referred to below as supporting points of the GP, represent a previously considered GMM for creating the trajectories. For simplicity, this inner product $\langle p,q \rangle$ is referred to below as an inner product between the GMM and the GP. The inner product is preferably an $L^2$ inner product.

In addition, it is provided that the inner product is ascertained as one sum over a plurality of normal distributions. The plurality of normal distributions includes in each case a normal distribution for each possible combination between the mixture components of the GMM and supporting points of the GP. The plurality of normal distributions are in each case parameterized in such a way that they include the particular expected value of the mixture component, given the expected value of the supporting point, and as variance, one sum over the variances of the particular mixture components and the supporting points in question as parameters. The plurality of normal distributions are in each case weighted with the weights of the associated mixture component and the supporting points of the GP. A weight (mixture weight) may be associated with each mixture component of the GMM and with each supporting point of the GP.

In addition, it is provided that the input parameter of kernel k, i.e., the distance between p and q, is the square root of the inner product $(\langle p-q, p-q \rangle)$ of the difference between the GMM and the GP.

In addition, it is provided that the inner product is solved according to the second binomial formula, and the individual terms of the solved second binomial formula are ascertained as one sum over a plurality of normal distributions, as described above. The second binomial formula is: $\langle p-q, p-q \rangle = \langle p,p \rangle - 2\langle p,q \rangle + \langle q,q \rangle$, where the combinations of the mixture components or supporting points are then used in each case for the same terms $\langle p,p \rangle$, $\langle q,q \rangle$.

In addition, it is provided that length scales are associated in each case with the mixture components of the GMM and the supporting points of the GP, the distance being scaled, in particular normalized, as a function of the length scales.

In addition, it is provided that trajectories are re-created after the optimization of the GP, for this purpose parameters for the GMM being ascertained as a function of the GP. An acquisition function uses the GP to ascertain the parameters of the GMM. The GMM is then parameterized, using this parameter, in order to then create further trajectories with the aid of the newly parameterized GMM. Costs are likewise computed for the further trajectories. The GP is subsequently re-optimized as a function of the further trajectories and associated costs.

A dynamic domain adaptation (DDA) is preferably used for the optimization. For further details, see the publication by authors Fröhlich, Lukas P., et al., "Bayesian Optimization for Policy Search in High-Dimensional Systems via Automatic Domain Selection," arXiv preprint arXiv:2001.07394 (2020), downloadable online at: https://arxiv.org/abs/2001.07394.pdf. This has the advantage that a particularly efficient method is achieved by the use of DDA.

In addition, it is provided that a trajectory for the robot is ascertained as a function of the policy, using the replaced parameters, in particular the robot being controlled as a function of the partial trajectories obtained therefrom. A control variable for the robot is preferably provided as a function of the policy.

In further aspects, the present invention relates to a device and a computer program, each of which is configured to carry out the above method, and a machine-readable memory medium on which this computer program is stored.

Specific embodiments of the present invention are explained in greater detail below with reference to the figures.

DETAILED DESCRIPTION OF EXAMPLE EMBODIMENTS

Figure 1:
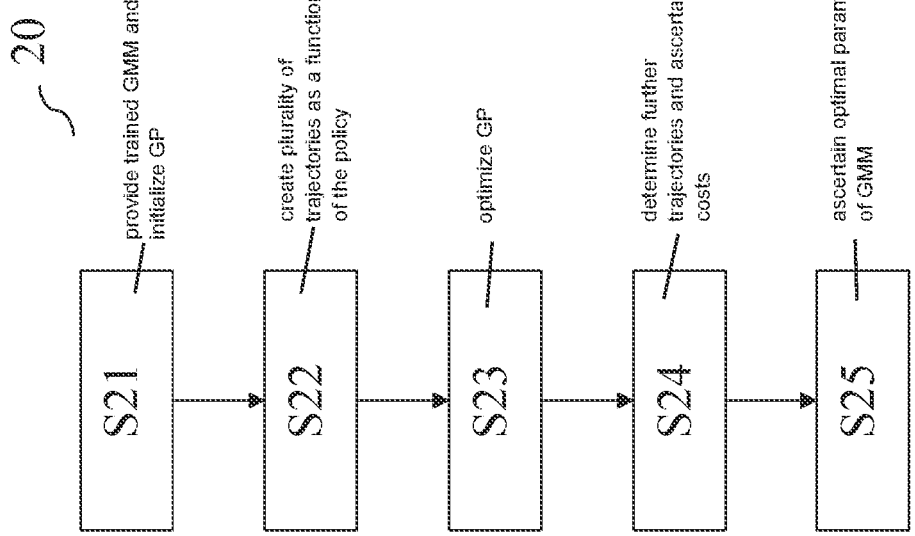
FIG. 1 schematically shows a flowchart of one specific example embodiment of the present invention.

The behavior of complex autonomous systems such as manipulation robots is typically encoded via a so-called policy that maps an instantaneous robot state s onto a desired action a. Various parameterizations for policies have been proposed: neural networks, dynamic motion primitives, and Gaussian mixture models (GMMs). In particular for manipulation robots, policies based on GMMs have proven to be useful due to their flexibility for detecting complex motions, as well as the relatively small number of parameters.

Kinesthetic demonstrations represent a typical way to "train" this policy; i.e., an expert physically takes hold of the robot and demonstrates the desired behavior (a process referred to as "learning from demonstrations"). Based on the recorded behavior, in particular trajectories, the behavior may then be encoded with the aid of a GMM. After the policy has been trained, the resulting behavior of the robot may still be suboptimal and must be further coordinated in order to completely achieve the desired objective. A Bayesian optimization (BO) may be used for this subsequent coordination step.

The suboptimal behavior of the policy may also be due to the fact that the policy is to be adapted for a new task, or that different conditions prevail, for example that the starting position is changed.

In general, BO is typically used when an unknown function for which no analytical form exists, and which may only be evaluated at specific points, is to be optimized. Each evaluation of the function is costly, since it consumes a great deal of time and/or resources.

Due to the high costs of each evaluation, it is desirable to take random samples, and also to be as efficient as possible in order to find the optimum of the function. One of the main elements of BO is a so-called surrogate model which approximates the function on the basis of earlier observations. A Gaussian process (GP) is preferably used for the surrogate model. The Gaussian process may be optimized with the aid of BO in such a way that, based on earlier assessment points $(x_1; \ldots ; x_n)$ and the corresponding observations ($y_1; \ldots ; y_n$), it learns their relationship and may make a prediction for subsequent given assessment points $x_{n+1}$ via an observation $y_{n+1}$. OR their relationship is learned and a prediction for subsequent given assessment points $x_{n+1}$ via an observation $y_{n+1}$ may be made.

A key property of the GPs is that they detect uncertainties in the prediction; i.e., the prediction uncertainty is low in the proximity of data, while it increases farther away from data.

This surrogate model may be utilized to find the next model optimal assessment point by optimization of a so-called detection function. This detection function weighs exploration (i.e., preference for points having high prediction uncertainty) against exploitation (i.e., preference for points having a good prediction result). Many different detection functions have been proposed in recent years. When the optimum of the detection function has been found, the target function at this location is assessed and the GP is updated with new data $x_{n+1}; y_{n+1}$. This method is repeated until either a sufficiently good solution is found or a maximum number of optimization steps is reached.

It is disadvantageous that BO cannot be directly scaled to high-dimensional search spaces.

In accordance with an example embodiment of the present invention, for this purpose, the inventors have provided for achieving the scaling of BO to higher-dimensional parameter spaces by attaining additional domain knowledge by creating a specialized kernel function k.

For many scenarios, kernel function k is a function only of distance d between two elements; i.e., $k(x; x_0) = k(d(x; x_0))$.

The Euclidian distance in the parameter space is typically not well suited for correctly detecting the difference in behavior between two policies. This is because the Euclidian distance is not invariant with respect to differently parameterized policies.

For this reason, the inventors have provided a kernel function k, tailored to GMMs, for use in GPs. This kernel function is based on the probability product kernel (PPK), which defines an inner product between two probability distributions p and q:

$$k_{PPK}(p,q) = \int p(x)q(x)dx = \langle p,q \rangle_{L_2} \quad \text{Equation (1)}$$

It is noted that p and q are the GMM and the GP.

It is further provided to manipulate the PPK kernel in such a way that it is a stationary kernel. In order to allow utilization of the properties of conventional kernels, for example the Matérn 5/2 kernel, it is provided to insert the PPK kernel into conventional kernels.

It is therefore provided to compute the distance between p and q as follows:

$$d(p,q) = \sqrt{\langle p-q, p-q \rangle} = \sqrt{\langle p,p \rangle - 2\langle p,q \rangle + \langle q,q \rangle} \quad \text{Equation (2)}$$

This distance according to equation (2) may then be inserted into conventional kernel functions, the individual inner products being computed using the PPK kernel. Under the assumption that p and q are GMM and GP, the inner product needed for this purpose may be analytically computed:

$$\langle p,q \rangle = \Sigma_{k,k'} \pi_k \pi_{k'} N(\mu_k | \mu_{k'}, \sigma_k, \sigma_{k'}) \quad \text{Equation (3)}$$

where $\pi_k$; $\pi_{k'}$; $\sigma_k$ respectively denote weights, an average value, and the covariance of mixture component k of the GMM or supporting point of the GP.

Most stationary kernels include a so-called length scale, also referred to as a relevance parameter, which scales the distance between two elements. This parameter is generally numerically estimated in order to optimally adapt the data underlying the GP. This may be carried out, for example, using an automatic relevance determination (ARD for short). Equation (3) may be expanded to allow relevance parameters to be used:

$$\langle p,q \rangle^l = \Sigma_{k,k'} \frac{\pi_k \pi_{k'}}{l_k l_{k'}} N(\mu_k | \mu_{k'}, \sigma_k + \sigma_{k'}), \quad \text{Equation (4)}$$

using length scales $l_k$ for the kth mixture component and supporting point.

The distance computed according to equation (2) may then be inserted into the Matérn 5/2 kernel. Other kernels, for example the Matérn 3/2 kernel, are also conceivable:

$$k = \sigma^2 \left(1 + \frac{\sqrt{3}r}{l_k}\right) \exp\left(-\frac{\sqrt{3}r}{l_k}\right) \quad \text{Equation (2)}$$

FIG. 1 schematically shows a flowchart (20) of a method for optimizing a predefined policy for a robot, the policy being a GMM.

The method begins with step S21. The GMM, which preferably has already been trained and is thus suitable for proposing a partial trajectory for the robot, is provided in this step. In addition, a GP is initialized in step S21, so that the GP is suitable for outputting costs as a function of the parameters of the GMM. The costs characterize an outlay, for example of time or energy, that the robot must expend in order to reach a target position from its starting position/state, following the policy, in particular the trajectory, which is ascertained as a function of the policy.

The GP includes at least one kernel function k, which is used according to the computations provided above in order to ascertain the distance between the GMM and the GP.

This is followed by step S22. A plurality of trajectories is created in this step as a function of the policy. Associated costs are ascertained for each of the created trajectories. These trajectories may be ascertained by experiments, for example, by controlling the robot according to the particular created policies.

This is followed by step S23. The GP is optimized in this step with the aid of BO and as a function of the parameters of the GMM that are used and the associated costs, so that the GP predicts the costs as a function of the parameters.

Step S24 may optionally be subsequently carried out. The GP is used in this step to determine further trajectories in a targeted manner and to ascertain their costs. These further trajectories are used to explore the search space and to approximate the optimal costs. For this purpose, parameters for the GMM are provided as a function of the output uncertainty of the GP or as a function of a presumed optimum with regard to optimal costs that are predicted by the GP, in order to then create further trajectories as a function of the GMM that is parameterized using these parameters.

After further trajectories and costs have been ascertained in step S24, the GP is subsequently reoptimized in step S24, using BO and the new data.

Step S25 follows step S23 or step S24. The associated optimal parameters of the GMM are then ascertained in step S25 with the aid of the GP for its output optimal costs. This may be carried out using a Broyden-Fletcher-Goldfarb-Shanno (BFGS) method, for example. This is followed by a replacement of the parameters of the GMM with the optimal parameters.

The method is terminated after completion of step S25. It is noted that step S24 may be carried out multiple times in succession. It is conceivable for further steps to follow after step S25, in which the adapted GMM from step S25 is then used to operate the robot. Possible uses of the GMM for robots or manufacturing machines or autonomous vehicles are explained as an example, with reference to the subsequent figures.

Figure 2:
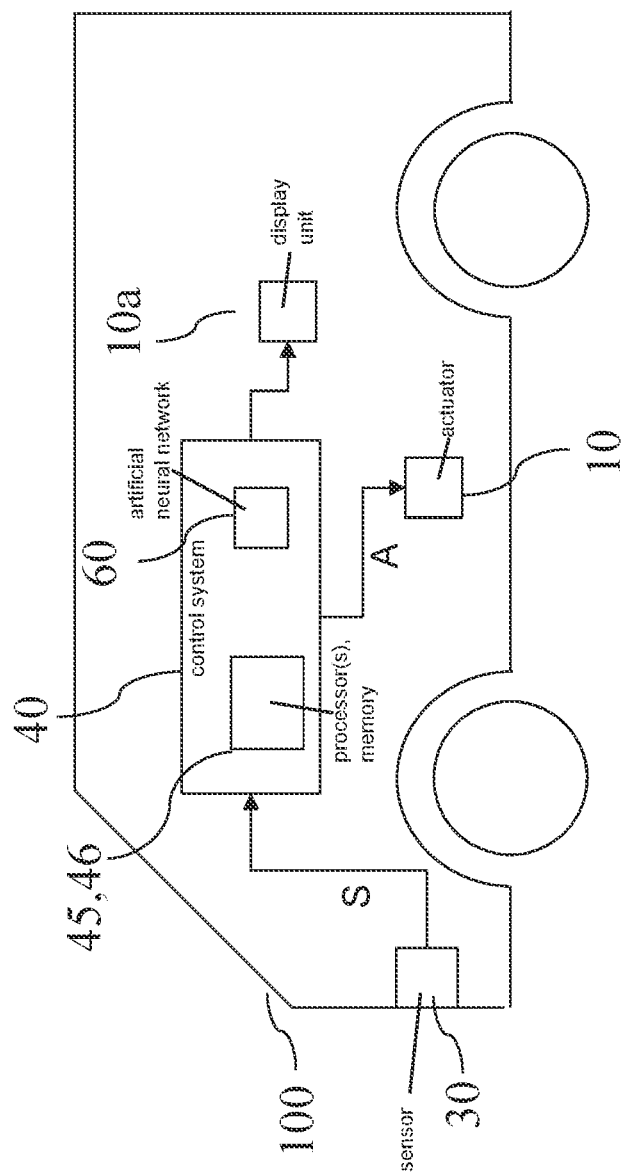
FIG. 2 schematically shows one exemplary embodiment for controlling an at least semi-autonomous robot, in accordance with the present invention.

FIG. 2 shows an actuator 10. The surroundings are detected at preferably regular time intervals in a sensor 30, in particular an imaging sensor such as a video sensor, which may also be provided by a plurality of sensors, for example a stereo camera. Other sensors are also conceivable, for example radar, ultrasonic or LIDAR sensors, as well as GPS or rotation rate sensors, accelerometers, or angle encoders at the actuator itself. Sensor signal S (or in the case of multiple sensors, one sensor signal S each) of sensor 30 is transferred to control system 40. Control system 40 thus receives a series of sensor signals S. Control system 40 ascertains activation signals A therefrom, which are transferred to actuator 10.

The detected sensor signals are then supplied to the parameterized GMM after step S25.

The GMM then outputs a partial trajectory. As a function of the partial trajectory, an activation signal for actuator 10 is ascertained with the aid of a processing unit, and the actuator is appropriately activated and carries out a corresponding action.

In further preferred specific embodiments, control system 40 includes one or multiple processors 45 and at least one machine-readable memory medium 46 on which instructions are stored, which when executed on processors 45 then prompt control system 40 to carry out the method according to the present invention.

In alternative specific embodiments, as an alternative or in addition to actuator 10, a display unit 10a which may display the output of the GMM is provided.

FIG. 2 shows how control system 40 may be used for controlling an at least semi-autonomous robot, in the present case an at least semi-autonomous motor vehicle 100.

Actuator 10, which is preferably situated in motor vehicle 100, may be, for example, a brake, a drive, or a steering system of motor vehicle 100.

Alternatively, the at least semi-autonomous robot may be some other mobile robot (not depicted), for example one that moves by flying, swimming, diving, or walking. The mobile robot may also be, for example, an at least semi-autonomous lawn mower or an at least semi-autonomous transport robot. Also in these cases, activation signal A may be ascertained in such a way that the drive and/or the steering system of the mobile robot are/is activated in such a way that the at least semi-autonomous robot prevents, for example, a collision with objects identified by artificial neural network 60.

Alternatively or additionally, display unit 10a may be activated as a function of activation signal A. In addition, for example for a motor vehicle 100 with a nonautomated steering system, it is possible for display unit 10a to be activated via activation signal A in such a way that the display unit outputs a visual or acoustic warning signal when it is ascertained that motor vehicle 100 is at risk.

Figure 3:
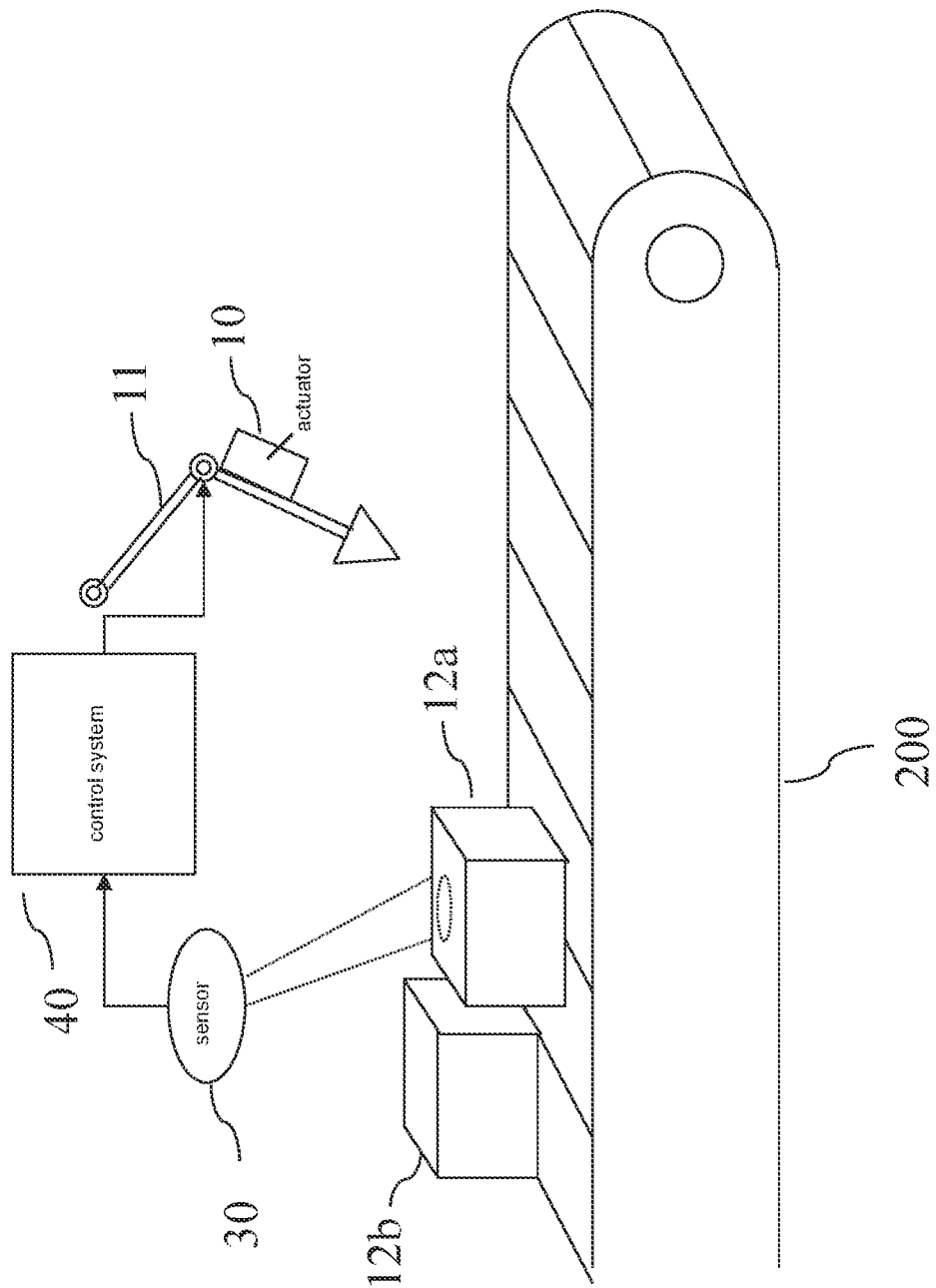
FIG. 3 schematically shows one exemplary embodiment for controlling a manufacturing system, in accordance with the present invention.

FIG. 3 shows one exemplary embodiment in which control system 40 is used for activating a manufacturing machine 11 of a manufacturing system 200, in that an actuator 10 that activates this manufacturing machine 11 is activated. Manufacturing machine 11 may be, for example, a machine for punching, sawing, drilling, and/or cutting.

Sensor 30 may then be an optical sensor, for example, which for example detects properties of manufactured products 12a, 12b. It is possible for these manufactured products 12a, 12b to be movable. It is possible for actuator 10 which activates manufacturing machine 11 to be activated as a function of an association of detected manufactured products 12a, 12b, so that manufacturing machine 11 correspondingly carries out a subsequent processing step of correct manufactured product 12a, 12b.

What is claimed is:

1. A method for optimizing a predefined policy for a robot, the policy being a Gaussian mixture model that outputs at least one partial trajectory as a function of a starting state and a target state of the robot, the method comprising the following steps:
   initializing a Gaussian process that is suitable for estimating, as a function of a parameterization of the Gaussian mixture model, costs that the robot must incur in order to reach the target state, the Gaussian process including at least one kernel which obtains an input parameter as a function of a distance that is ascertained between probability distributions, which are characterized in each case by the Gaussian mixture model and the Gaussian process, according to a probability product kernel;
   creating a plurality of trajectories as a function of the policy;
   ascertaining the costs for each of the trajectories of the plurality of trajectories;
   optimizing the Gaussian process in such a way that, for the plurality of trajectories, the Gaussian process estimates the ascertained costs as a function of used parameters of the Gaussian mixture model;
   ascertaining optimal parameters for the Gaussian mixture model with the aid of the Gaussian process, so that the Gaussian process outputs optimal costs for the optimal parameters;
   replacing the parameters of the Gaussian mixture model with the optimal parameters;
   supplying sensor signals to the Gaussian mixture model;
   outputting, by the Gaussian mixture model, a partial trajectory, using the supplied sensor signals;
   ascertaining an actuation signal as a function of the partial trajectory; and
   activating and controlling an actuator of the robot using the actuation signal.

2. The method as recited in claim 1, wherein the distance is computed according to a probability product kernel as a function of an inner product ($\langle p,q \rangle$) between the Gaussian mixture model (p) and the Gaussian process (q).

3. The method as recited in claim 2, wherein the inner product is ascertained as a function of one sum over a plurality of normal distributions, each of the plurality of normal distributions including a normal distribution for each possible combination between mixture components of the Gaussian mixture model and supporting points of the Gaussian process, each of the plurality of normal distributions being parameterized, using an expected value of a particular mixture component, given an expected value of a particular supporting point, and using one sum over variances of the particular mixture components and the particular supporting points, the plurality of normal distributions being weighted in each case with weights of the particular mixture component of the Gaussian mixture model and the particular supporting points of the Gaussian process.

4. The method as recited in claim 3, wherein the distance is a function of a square root of the inner product ($\langle p-q,p-q$ )) of a difference between the Gaussian mixture model and the Gaussian process and the difference.

5. The method as recited in claim 4, wherein the inner product is solved from the differences according to a second binomial formula, and individual terms ($\langle p,p \rangle - 2\langle p,q \rangle + \langle q,q \rangle$) of the solved second binomial formula are ascertained as one sum over the plurality of normal distributions.

6. The method as recited in claim 1, wherein the kernel is a Matèrn kernel.

7. The method as recited in claim 1, wherein the kernel is a Matèrn 5/2 kernel.

8. The method as recited in claim 3, wherein length scales are associated with the mixture components of the Gaussian mixture model and the supporting points of the Gaussian process, the length scales scaling the distance ascertained according to a probability product kernel.

9. A device configured to optimize a predefined policy for a robot, the policy being a Gaussian mixture model that outputs at least one partial trajectory as a function of a starting state and a target state of the robot, the device configured to:
- initialize a Gaussian process that is suitable for estimating, as a function of a parameterization of the Gaussian mixture model, costs that the robot must incur in order to reach the target state, the Gaussian process including at least one kernel which obtains an input parameter as a function of a distance that is ascertained between probability distributions, which are characterized in each case by the Gaussian mixture model and the Gaussian process, according to a probability product kernel;
- create a plurality of trajectories as a function of the policy;
- ascertain the costs for each of the trajectories of the plurality of trajectories;
- optimize the Gaussian process in such a way that, for the plurality of trajectories, the Gaussian process estimates the ascertained costs as a function of used parameters of the Gaussian mixture model;
- ascertain optimal parameters for the Gaussian mixture model with the aid of the Gaussian process, so that the Gaussian process outputs optimal costs for the optimal parameters;
- replace the parameters of the Gaussian mixture model with the optimal parameters;
- supply sensor signals to the Gaussian mixture model;
- output, by the Gaussian mixture model, a partial trajectory, using the supplied sensor signals;
- ascertain an actuation signal as a function of the partial trajectory; and
- activate and control an actuator of the robot using the actuation signal.

10. A non-transitory machine-readable memory medium on which is stored a computer program for optimizing a predefined policy for a robot, the policy being a Gaussian mixture model that outputs at least one partial trajectory as a function of a starting state and a target state of the robot, the computer program, when executed by a computer, causing the computer to perform the following steps:
- initializing a Gaussian process that is suitable for estimating, as a function of a parameterization of the Gaussian mixture model, costs that the robot must incur in order to reach the target state, the Gaussian process including at least one kernel which obtains an input parameter as a function of a distance that is ascertained between probability distributions, which are characterized in each case by the Gaussian mixture model and the Gaussian process, according to a probability product kernel;
- creating a plurality of trajectories as a function of the policy;
- ascertaining the costs for each of the trajectories of the plurality of trajectories;
- optimizing the Gaussian process in such a way that, for the plurality of trajectories, the Gaussian process estimates the ascertained costs as a function of used parameters of the Gaussian mixture model;
- ascertaining optimal parameters for the Gaussian mixture model with the aid of the Gaussian process, so that the Gaussian process outputs optimal costs for the optimal parameters; and
- replacing the parameters of the Gaussian mixture model with the optimal parameters;
- supplying sensor signals to the Gaussian mixture model;
- outputting, by the Gaussian mixture model, a partial trajectory, using the supplied sensor signals;
- ascertaining an actuation signal as a function of the partial trajectory; and
- activating and controlling an actuator of the robot using the actuation signal.

11. The method as recited in claim 1, wherein the robot is an at least semi-autonomous vehicle.

12. The method as recited in claim 1, wherein the robot is a manufacturing system.

* * * * *